US006737028B1

(12) United States Patent
Scepanski et al.

(10) Patent No.: US 6,737,028 B1
(45) Date of Patent: May 18, 2004

(54) SOLID CAST CONTAINER

(75) Inventors: William H. Scepanski, Bloomington, MN (US); Timothy E. Laughlin, Edina, MN (US)

(73) Assignee: Sunburst Chemicals, Inc., Bloomington, MN (US)

( * ) Notice: Subject to any disclaimer, the term of this patent is extended or adjusted under 35 U.S.C. 154(b) by 0 days.

(21) Appl. No.: 09/578,642

(22) Filed: May 25, 2000

Related U.S. Application Data

(60) Provisional application No. 60/137,069, filed on Jun. 2, 1999.

(51) Int. Cl.[7] ................................................ B01D 11/02

(52) U.S. Cl. ........................ 422/263; 134/25.1; 252/90; 422/261; 422/264; 422/266

(58) Field of Search .......................... 252/90; 134/25.1; 422/261, 263, 264, 266

(56) References Cited

U.S. PATENT DOCUMENTS

| | | | | |
|---|---|---|---|---|
| RE32,818 | E | | 1/1989 | Fernholz et al. |
| D304,102 | S | | 10/1989 | Lakhan et al. |
| D306,224 | S | | 2/1990 | Nystuen |
| D308,738 | S | | 6/1990 | Nystuen |
| D308,739 | S | | 6/1990 | Nystuen |
| 5,007,559 | A | * | 4/1991 | Young ........................... 222/1 |
| 5,014,211 | A | | 5/1991 | Turner et al. |
| 5,016,790 | A | | 5/1991 | Thomas et al. |
| 5,033,649 | A | | 7/1991 | Copeland et al. |
| 5,048,559 | A | | 9/1991 | Mathieu et al. |
| 5,100,032 | A | | 3/1992 | Burdorf et al. |
| 5,137,694 | A | | 8/1992 | Copeland et al. |
| 5,147,615 | A | | 9/1992 | Bird et al. |
| 5,176,297 | A | | 1/1993 | Mooney et al. |
| 5,183,077 | A | | 2/1993 | Keiper |
| 5,186,912 | A | | 2/1993 | Steindorf et al. |
| 5,194,230 | A | | 3/1993 | PeKarna et al. |
| 5,195,966 | A | | 3/1993 | Corby |
| D337,370 | S | | 7/1993 | Spriggs et al. |
| 5,234,162 | A | | 8/1993 | Sullivan |
| 5,248,066 | A | | 9/1993 | Olson et al. |
| 5,249,737 | A | | 10/1993 | Fritz et al. |
| 5,268,153 | A | | 12/1993 | Muller |
| 5,295,799 | A | | 3/1994 | Prewitt |
| 5,310,430 | A | | 5/1994 | McCall, Jr. |
| 5,320,118 | A | | 6/1994 | Fernholz |
| 5,342,587 | A | | 8/1994 | Laughlin et al. |
| 5,384,102 | A | | 1/1995 | Ferguson et al. |
| D357,762 | S | | 4/1995 | Douglas |
| 5,404,893 | A | | 4/1995 | Brady et al. |
| 5,411,716 | A | | 5/1995 | Thomas et al. |
| 5,417,233 | A | | 5/1995 | Thomas et al. |

(List continued on next page.)

*Primary Examiner*—Krisanne Thornton
(74) *Attorney, Agent, or Firm*—Patterson, Thuente, Skaar & Christensen, P.A.

(57) ABSTRACT

A container for use with a solution dispenser, the solution dispenser generating a solution by impinging a solvent spray on a solid cast chemical product disposed within the container, the container being disposable in an inverted disposition in a solution dispenser bowl includes a container body suitable for containing a flowable chemical composition and supporting a casting of the chemical composition. The container body has a mouth for receiving the solvent spray therein; and has a container bottom being disposed generally opposed to the mouth; and further has an inclined side portion operably coupled to and extending between the container bottom portion and the container mouth, the cross sectional dimension of the side portion decreasing from the container bottom portion to the container mouth. A chemical dispenser includes at least one of the aforementioned containers. A method of promoting consistent dissolution of cast chemical product includes inclining a side portion of the container inward from a container bottom portion toward the mouth of the container.

38 Claims, 12 Drawing Sheets

U.S. PATENT DOCUMENTS

| | | | |
|---|---|---|---|
| 5,427,748 | A | 6/1995 | Wiedrich et al. |
| D360,135 | S | 7/1995 | Balz |
| 5,443,094 | A | 8/1995 | Olson et al. |
| 5,453,131 | A | 9/1995 | Chan et al. |
| 5,456,297 | A | 10/1995 | Crossdale et al. |
| 5,478,537 | A | 12/1995 | Laughlin et al. |
| 5,500,050 | A | 3/1996 | Chan et al. |
| 5,501,742 | A | 3/1996 | Fernholz |
| 5,556,478 | A | 9/1996 | Brady et al. |
| D374,823 | S | 10/1996 | Decker et al. |
| D375,214 | S | 11/1996 | Decker et al. |
| D375,220 | S | 11/1996 | Copeland et al. |
| 5,597,019 | A | 1/1997 | Thomas et al. |
| 5,607,651 | A | 3/1997 | Thomas et al. |
| 5,627,150 | A | 5/1997 | Peterson et al. |
| 5,655,563 | A | 8/1997 | Johnson |
| D385,779 | S | 11/1997 | Sokol et al. |
| D388,991 | S | 1/1998 | Thomas et al. |
| 5,707,590 | A | 1/1998 | Thomas et al. |
| 5,716,260 | A | 2/1998 | Griffin et al. |
| 5,732,418 | A | 3/1998 | Sekitou |
| 5,732,724 | A | 3/1998 | Becknell |
| 5,738,135 | A | 4/1998 | Johnson |
| D394,124 | S | 5/1998 | Mackert et al. |
| D394,298 | S | 5/1998 | Mackert et al. |
| 5,770,039 | A | 6/1998 | Rigney et al. |
| 5,782,109 | A | 7/1998 | Spriggs et al. |
| 5,799,831 | A | 9/1998 | Spriggs et al. |
| 5,806,237 | A | 9/1998 | Nelson et al. |
| 5,810,201 | A | 9/1998 | Besse et al. |
| 5,816,446 | A | 10/1998 | Steindorf et al. |
| 5,853,034 | A | 12/1998 | Edwards et al. |
| D403,588 | S | 1/1999 | Jungmann |
| 5,899,215 | A | 5/1999 | Parker, III et al. |
| 5,967,202 | A | 10/1999 | Mullen et al. |
| 5,975,352 | A | 11/1999 | Spriggs et al. |
| 5,986,554 | A | 11/1999 | Furber et al. |
| 5,992,698 | A | 11/1999 | Copeland et al. |
| 5,996,907 | A | 12/1999 | Toetschinger et al. |
| 5,998,358 | A | 12/1999 | Herdt et al. |
| 6,007,735 | A | 12/1999 | Creed |
| D419,262 | S | 1/2000 | Klaers et al. |
| 6,012,567 | A | 1/2000 | Ferguson et al. |
| D423,743 | S | 4/2000 | Dawson et al. |
| D423,933 | S | 5/2000 | Fritz et al. |
| D424,167 | S | 5/2000 | Yuen et al. |
| D425,965 | S | 5/2000 | Yuen et al. |
| 6,056,012 | A | 5/2000 | Yuen et al. |
| D426,162 | S | 6/2000 | Olson |
| 6,079,595 | A | 6/2000 | Meyer et al. |
| D427,912 | S | 7/2000 | Johnson et al. |
| 6,098,646 | A | 8/2000 | Hennemann et al. |

* cited by examiner

FIG. 3
PRIOR ART
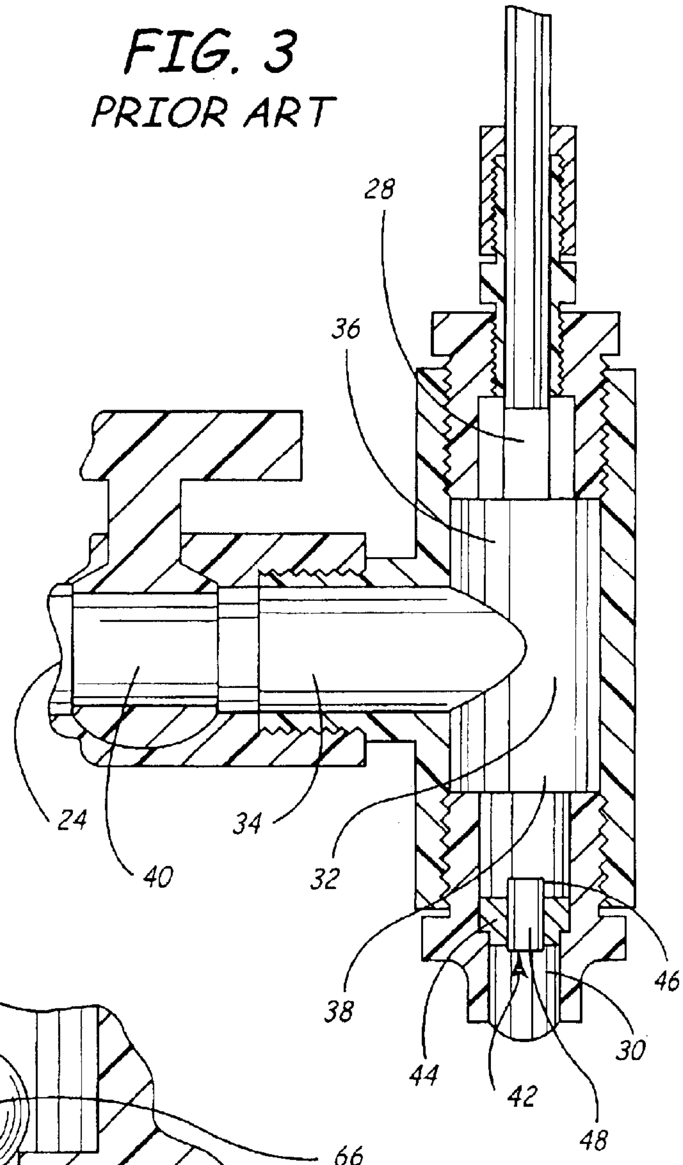
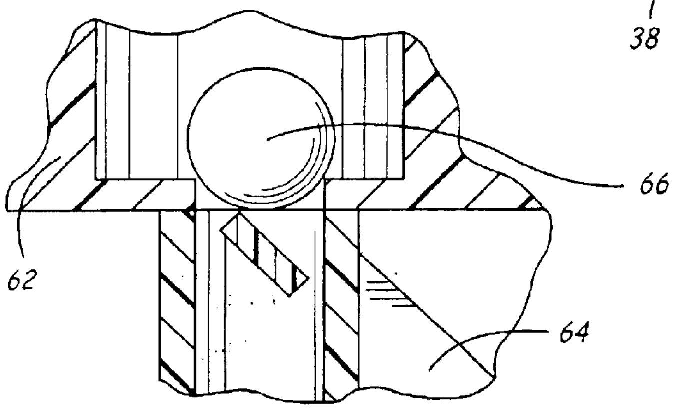
FIG. 4
PRIOR ART

SOLID CAST CONTAINER

RELATED APPLICATION

The present application claims the benefit of U.S. Provisional Application No. 60/137,069, filed Jun. 2, 1999, and incorporated herein in its entirety by reference.

TECHNICAL FIELD

The present invention relates to chemical solution generators. More particularly, the present invention relates to a container for a solid cast chemical product.

BACKGROUND OF THE INVENTION

Solid cast chemical compositions are typically formed in a hot, flowable state. The chemical composition is then poured in the flowable state into a container to substantially fill the container. Upon cooling, the chemical composition product solidifies within the container. Such solid cast chemical products have many advantages, including relatively less shipping expenses, since the water to form a solution need not be shipped, and the potential danger of spillage is greatly reduced. Typically, such solid cast chemical products are utilized for cleaning, disinfecting and the like. In operation, the container, with the solid cast chemical product solidified within it, is inverted and disposed within a bowl having a nozzle in the bottom portion of the bowl. Reference to FIGS. 1–4 of U.S. Pat. No. 5,549,875, incorporated herein by reference, may be had at this point. The bowl of the dispenser 10 is depicted at 14 in prior art FIGS. 1 and 2. The nozzle is depicted at 56 in FIG. 2. An upward directed water spray is depicted at 58 in FIG. 2. The spray 58 impinges upon the solid cast chemical product 60 cast in the container 52. A flowable chemical solution resulting from the dissolving action of the water (or other solvent) bearing upon the chemical product 60 collects at the bottom of the bowl 14 and flows outward through the outlet 68.

In the past as depicted in FIGS. 1 and 2, the container 52 in which the solid cast chemical product 60 was formed was straight (parallel) sided. One reason for straight sided container 52 is to accommodate a side-by-side disposition where the dispenser 10 includes a plurality of bowls 14 placed in a side-by-side arrangement. A problem with such straight parallel sided containers 52 was that a significant amount of the solid cast chemical product 60 remained undissolved in the upper portion of the inverted container 52. The spray 58 may not have been directed adequately to impinge upon the chemical product 60 at the bottom of the container 52. The spray 58 typically has a conical shape as depicted in FIG. 2 and may also include a center jet directed straight upward. The angle of the cone of the spray 58 is selected as a compromise to best impinge on the greatest volume of the cast chemical product 60 in the container 52, commencing with the portion of the cast chemical product 60 that is disposed close to the mouth 54 and ending with the last remaining cast chemical product 60 in the container 52 (that which is formed at or near the bottom of the container 52). A result of the compromise in spray design has been that last remaining cast chemical product 60 that is formed at the bottom of the container 52 has proved difficult to reach with the water spray 58 and remains solidified in the bottom of the container 52. In this case, the container 52 is then discarded with a substantial amount of cast chemical product 60 still formed therein. This cast chemical product 60 then becomes waste.

The amount of dissolution of the chemical product 60 is also affected by the temperature and pressure of the solvent comprising the spray 60 that is directed on the cast chemical product 60. It is desired that the temperature be relatively hot and the pressure be relatively high. These are variables that are difficult to control and to plan for when designing the nozzle 56. As can be appreciated, activating the dispenser 10 may result in relatively cool water being sprayed from the nozzle 56 until the water has had time to ran and advance a column of hot water to the dispenser 10. Further, some establishments that use the dispenser 10 typically have less than desired water pressure all the time. Additionally, with existing containers, a nozzle 56 that has a rather strong central jet (in addition to the depicted conical spray) dissolves the chemical product 60 disposed at the center of the bottom of the container 52, leaving a donut shaped ring of undissolved chemical at the periphery of the bottom of the container 52.

In view of forgoing, it would be a decided advantage in the industry to have a container for the solid cast chemical product that would promote dissolution of substantially all the cast chemical product in the container under varying conditions of water pressure and temperature at the nozzle 56 with a given conical spray 58 and further with a strong center jet. The container should also accommodate a side-by-side disposition where multiple bowls 14 are employed in a dispenser. Further, it would be a decided advantage to provided a consistent delivery of quantity of chemical product for each injection of solvent, commencing with a full container and ending with the container being empty.

SUMMARY OF THE INVENTION

The present invention substantially meets the aforementioned needs of the industry. The container of the present invention has inclined sides extending at least a portion of the way between the mouth of the container and the bottom of the container. The cross-section of the container generally increases with the distance from the mouth of the container to the bottom of the container. The container has a shape that is closely related to the shape of the conical spray of water that is directed into the container. With this configuration, a spray of liquid that typically expands conically the further that it is from the nozzle, expands more generally parallel with the increasing cross section of the container to readily reach the cast material disposed in the container. This is especially true for the cast material that is disposed most closely to the bottom of the container In an embodiment, the bottom of the container is domed to better expose the cast chemical disposed in the bottom to the spray, especially in the case where the nozzle generates a relatively strong central jet of spray. In a further embodiment the container of the present invention includes a flat formed thereon to accommodate a side-by-side disposition of a plurality of containers.

The container of the present invention promotes a substantially constant weight of chemical product being dissolved each injection of solvent without regard for the quantity of chemical product in the container at the time that the solvent injection is made. This has substantial benefit in ensuring that adequate dissolution occurs to accomplish the desired task of the solution, especially toward the end of the remaining chemical product in the container where the amount of chemical product dissolved per injection tended to fall off dramatically with the prior art container.

The present invention is a container for use with a solution dispenser, the solution dispenser generating a solution by impinging a solvent spray on a solid cast chemical product disposed within the container, the container being disposable in an inverted disposition in a solution dispenser bowl includes a container body suitable for containing a flowable chemical composition and supporting a casting of the chemical composition. The container body has a mouth for receiving the solvent spray therein; and has a container bottom being disposed generally opposed to the mouth; and further has an inclined side portion operably coupled to and extending between the container bottom portion and the container mouth, the cross sectional dimension of the side portion decreasing from the container bottom portion to the container mouth. The present invention is further a chemical dispenser including at least one of the aforementioned containers. Additionally, the present invention is a method of promoting consistent dissolution of cast chemical product that includes inclining a side portion of the container inward from a container bottom portion toward the mouth of the container.

BRIEF DESCRIPTION OF THE DRAWINGS

FIGS. 1–4 depict an exemplary bowl with nozzle and a prior art solid cast chemical product container inverted within the bowl;

DETAILED DESCRIPTION OF PREFERRED EMBODIMENTS

Figure 1:
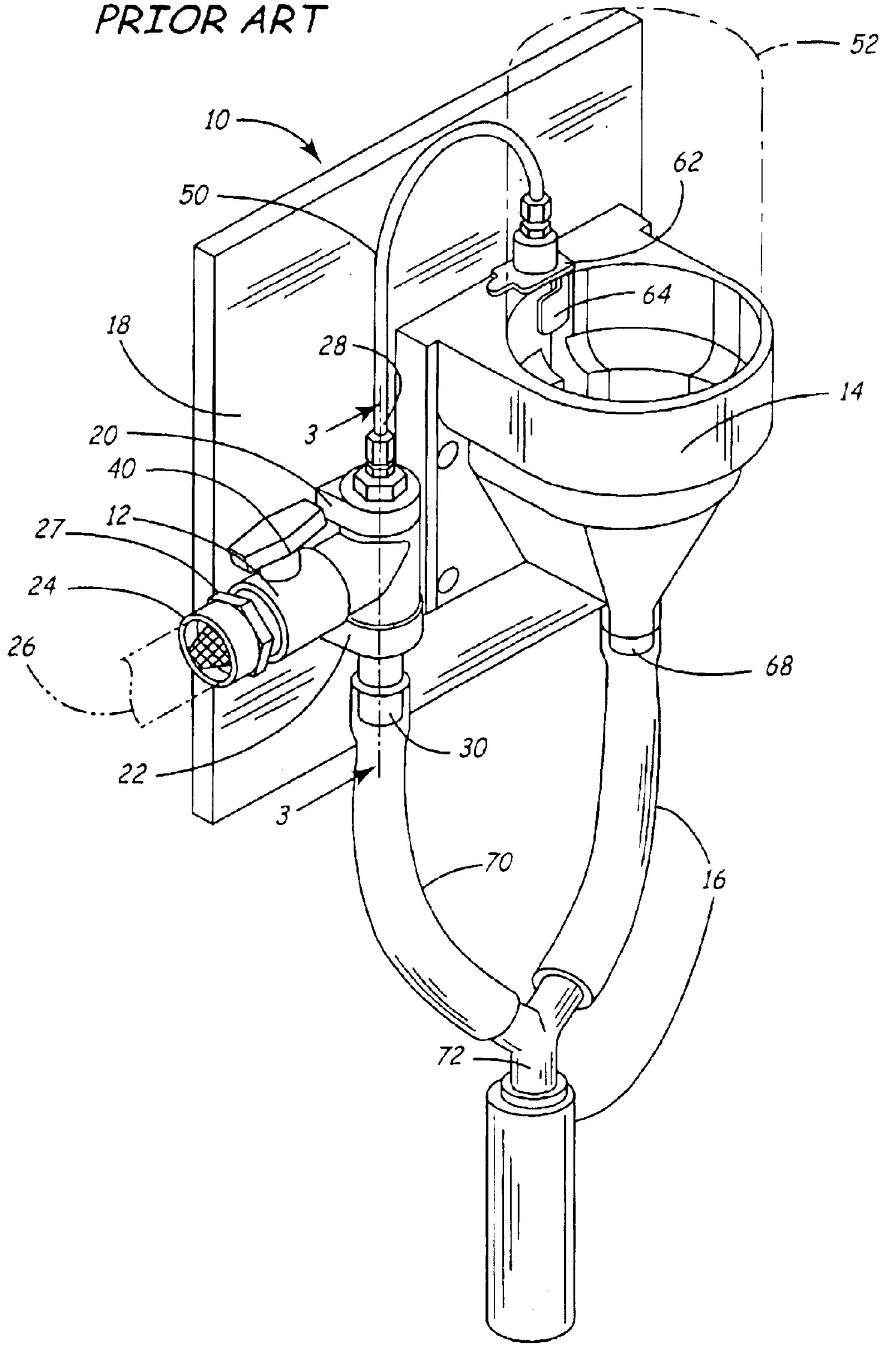
FIG. 1 PRIOR ART
Figure 2:
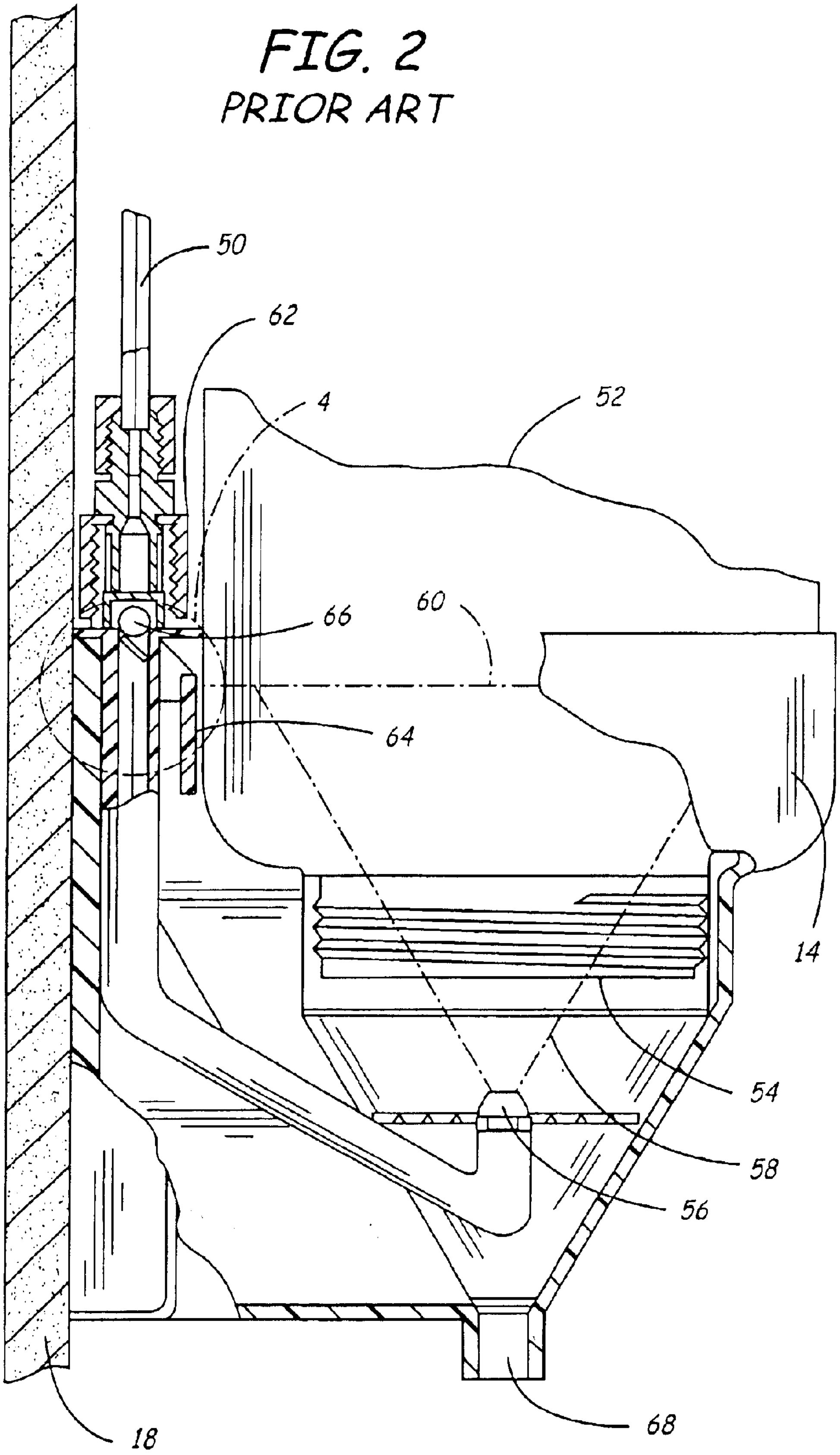
FIG. 2 PRIOR ART

The container of the present invention is shown generally at 110 in the FIGS. 5–10. The container 110 is depicted in the inverted disposition in all figures. The mouth 112 of the container 110 is open facing downward in the position in which the container 110 is received within the bowl 14 of prior art FIGS. 1 and 2. The container 110 is typically positioned in the upright disposition for filling of the container 110 with the chemical product that subsequently sets (is cast) in the container 110.

The mouth 112 is circular and preferably has threads formed on the exterior margin to engage a cap (not shown). The mouth 112 typically has a generous diameter in order to readily receive the chemical product when the chemical product is flowed into the container 110 and additionally to readily receive the upward directed spray therein. The mouth 112 preferably has a diameter between 2.5 and 4.5 inches, and is more preferably about 3.5 inches.

Figure 5:
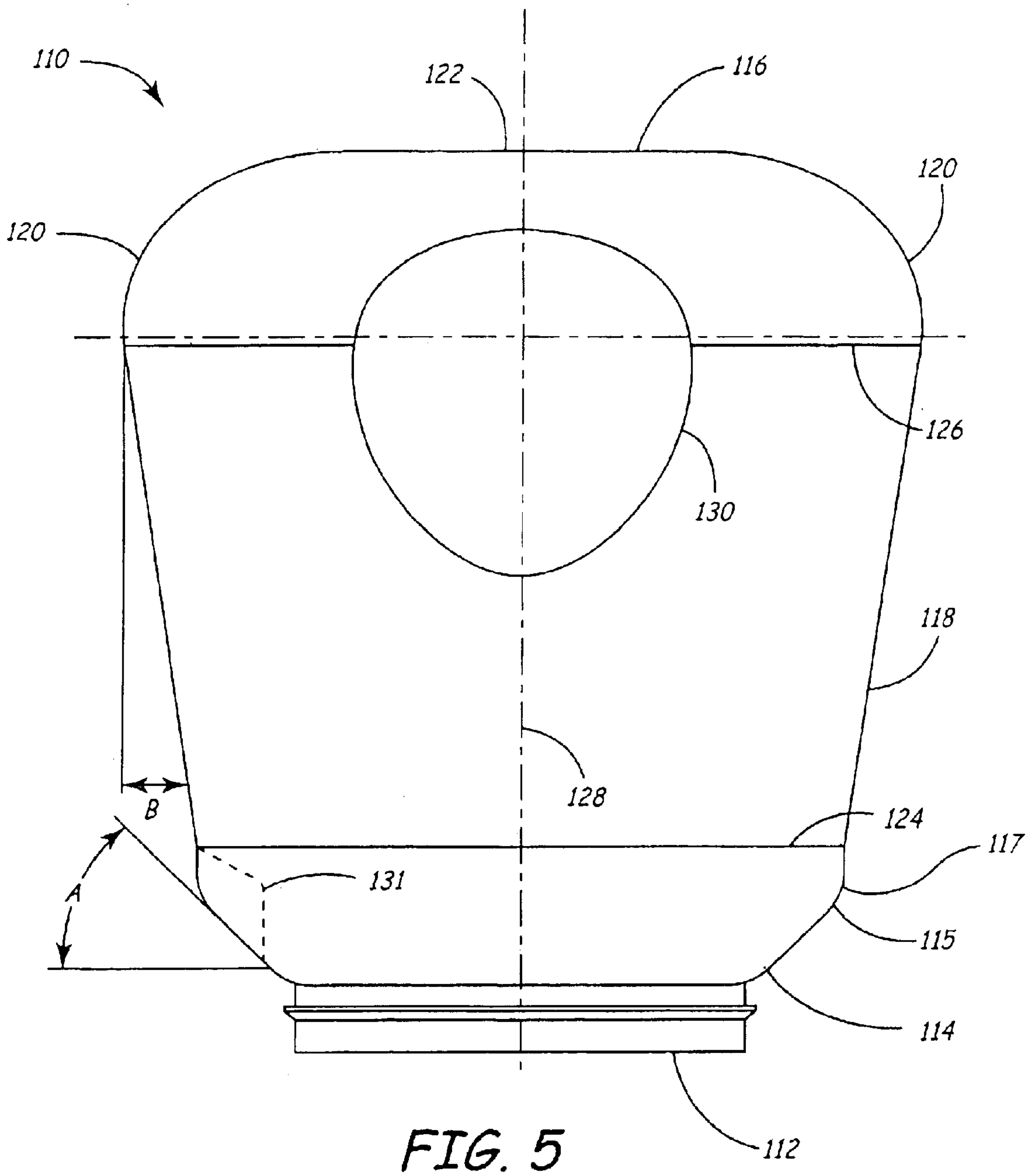
FIG. 5 is a side elevational view of a container of the present invention.
Figure 6:
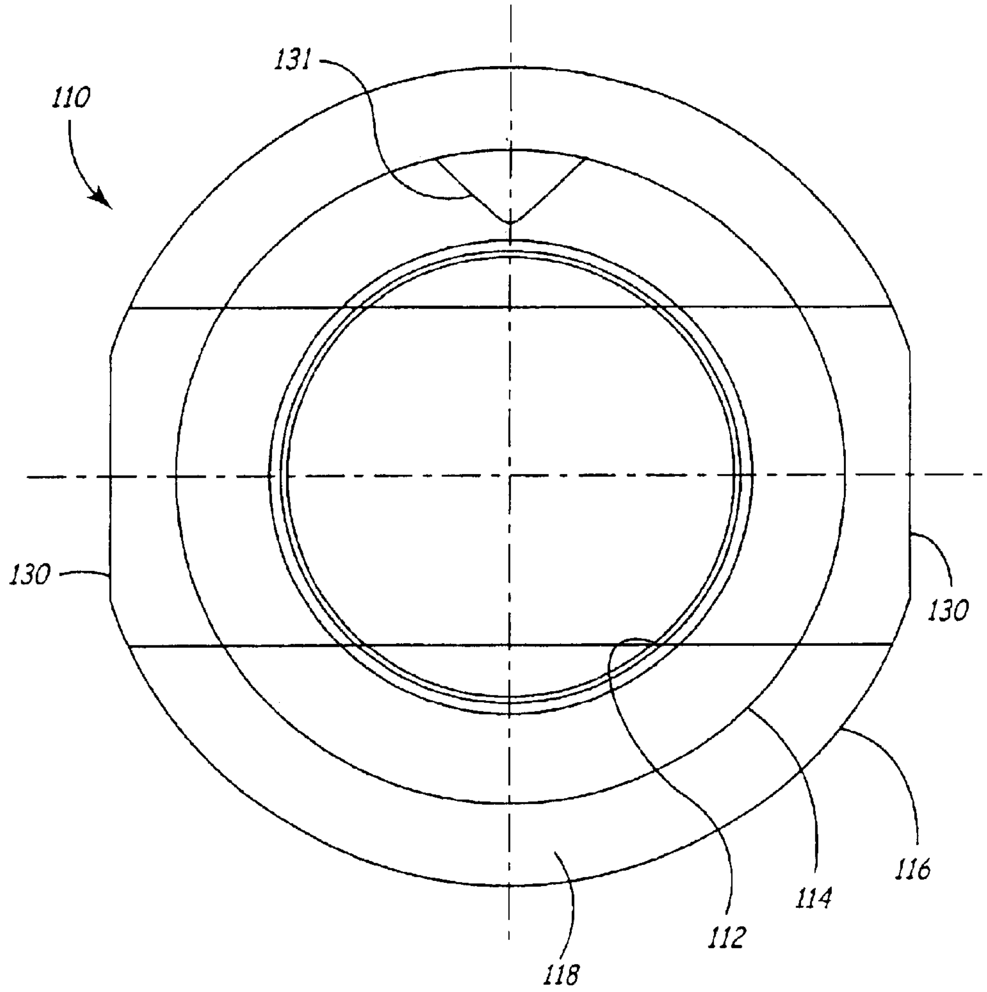
FIG. 6 is a bottom plan form view of the container of FIG. 5.
Figure 7:
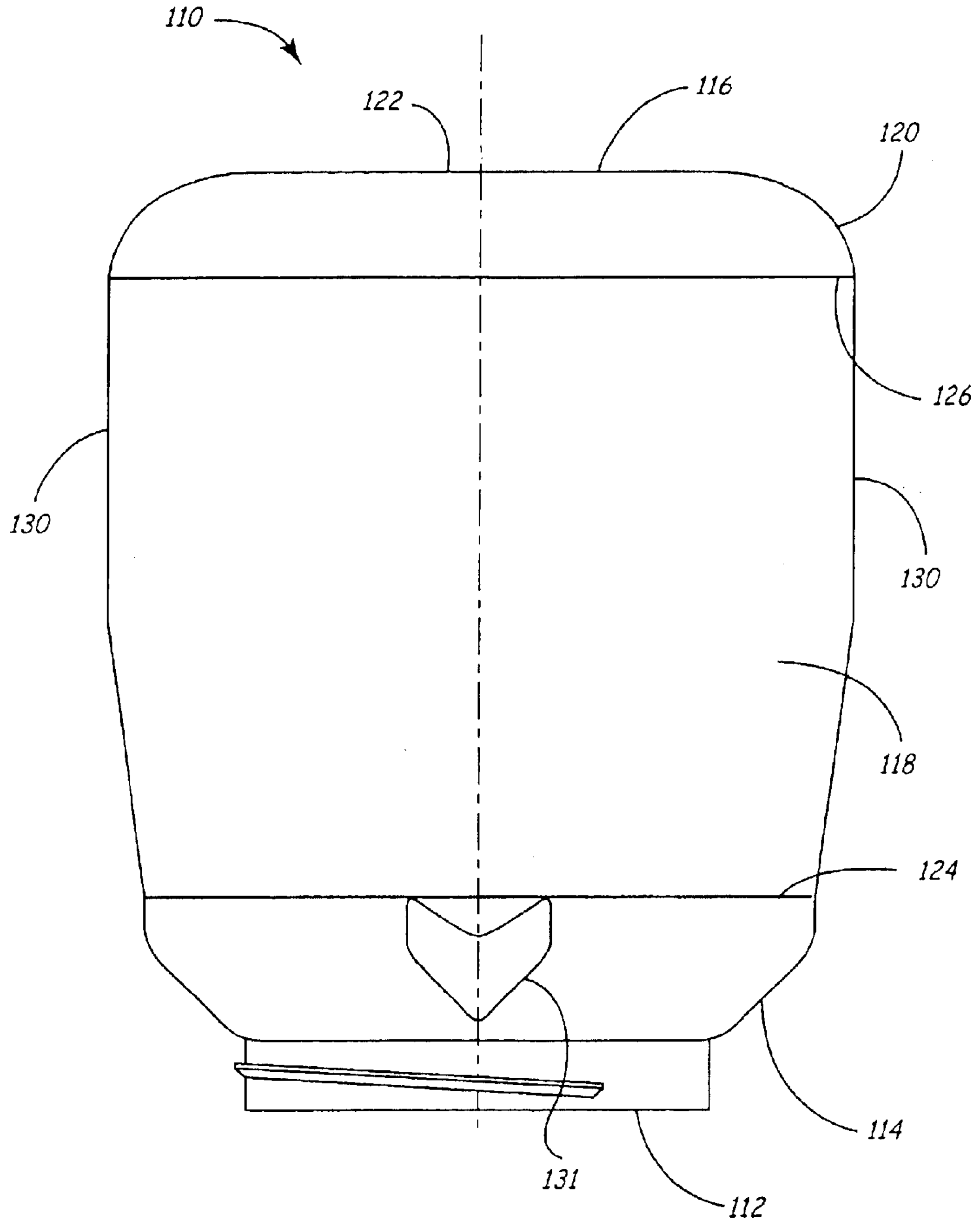
FIG. 7 is a side elevational view of the container of FIG. 5 rotated one quarter of a turn as compared to the depiction of FIG. 5.

The mouth 112 expands into a neck 114. In the depiction of FIGS. 5–7, both the mouth 112 and the neck 114 are generally circular in cross section. The neck 114 expands outward in diameter from the mouth 112 to the point of intersection 124 with the inclined sides 118 of the container 110. The neck 114 expands such that the neck 114 defines an included angle A of between 30 degrees and 60 degrees with respect to a line drawn radial to the center axis 128. Preferably the included angle A of expansion is about 45 degrees as depicted in FIG. 5. The neck 114 is radiused at 115 prior to the point of intersection 124 with the inclined sides 118. Prior to the point of intersection 124, a short, generally straight sided section 117 extends from the radius 115 to the point of intersection 124.

The container 110 has a bottom 116 having generally curved sides 120 and a generally flat bottom face 122. The curved sides 120 extend between the bottom surface 122 to a point of intersection 126 with the inclined sides 118. The curved sides 120 have a relatively generous radius to facilitate erosion of cast chemical product disposed on the inside surface of bottom 116. The radius of side 120 is between about 0.25 inch and 2.0 inch. The radius of side 120 is preferably about 1.5 inches, as depicted in FIG. 5. When the container 110 is in its upright disposition, the container 110 will rest stably on the bottom face 122. The bottom surface 122 is generally circular in shape, having a diameter of between 2.0 and 4.0 inches.

The inclined sides 118 extend from the point of intersection 126 with the sides 120 of the bottom 116 to the point of intersection 124 with the neck 114. The diameter of the inclined sides 118 at the point of intersection 124 with the neck 114 neck is less than the diameter of the inclined sides 118 at the point of intersection 126 with the bottom 116. The diameter at intersection 124 is preferably between 4.0 and 8.0 inches and is most preferably about 4.9 inches, as depicted in FIG. 5. The diameter at intersection 126 is preferably between 5.0 and 7.0 inches and is most preferably about 6.1 inches, as depicted in FIG. 5. Accordingly, the sides 118 of the container 110 incline inward from the bottom 116 to the neck 114, presenting an ever decreasing cross section as the neck 114 is approached. The included angle of inclination measured between the inclined side 118 and a line parallel with the center axis 128 of the container 110, as depicted at B in FIG. 5, is between 5 degrees and 30 degrees. The angle B is preferably about 9 (8.7) degrees as depicted in FIG. 5.

In the depiction of FIGS. 5–7, the container 110 has inclined sides 118 that are generally circular in cross section. Accordingly, the sides 118 define a portion of a cone truncated at both the intersections 124 and 126 of the cone. In certain uses, a number of dispensers 10 (a single such dispenser 10 being depicted in prior art FIGS. 1 and 2) are disposed adjacent to one another in a dispenser assembly. Such dispenser assemblies typically have a different cast chemical disposed in each different bowl 14 of the dispenser assembly, for example, a detergent, a bleach, and a rinse. In order to accommodate the containers 110 positioned in adjacent bowls 14, opposed flats 130 may be formed in the inclined sides 118 of the container 110. In this manner, the inclination of the inclined sides 118 is generally maintained without generating any interference between adjacent containers 110, a flat 130 of a first container 110 being disposed generally parallel and slightly spaced apart from a corresponding flat 130 of the adjacent container 110.

As depicted in FIGS. 6 and 7, the container 110 has a lockout 131 formed therein. The lockout 131 may be an indent (as depicted) or a raised portion that is designed to cooperatively mate with a corresponding raised portion or indent formed on the inner surface of the bowl 14, depicted in the prior art. The depicted exemplary lockout 131 is generally chevron shaped and is an indent. A corresponding raised slightly larger chevron is then formed on the inner surface of the prior art bowl 14. It is understood that the lockout 131 could have a plurality of suitable geometric shapes, including round, half-round, triangular, rectangular, or a combination of shapes. The lockout 131 acts to properly orient the flat 130 for positioning with respect to an adjacent container 110. The lockout 131 further acts to properly orient any informational data (such as a label) disposed on the container 110 for viewing by a user when the container 110 is disposed in the prior art bowl 14. Such data is typically viewed as being upside down when the container 110 is upright.

Figure 8:
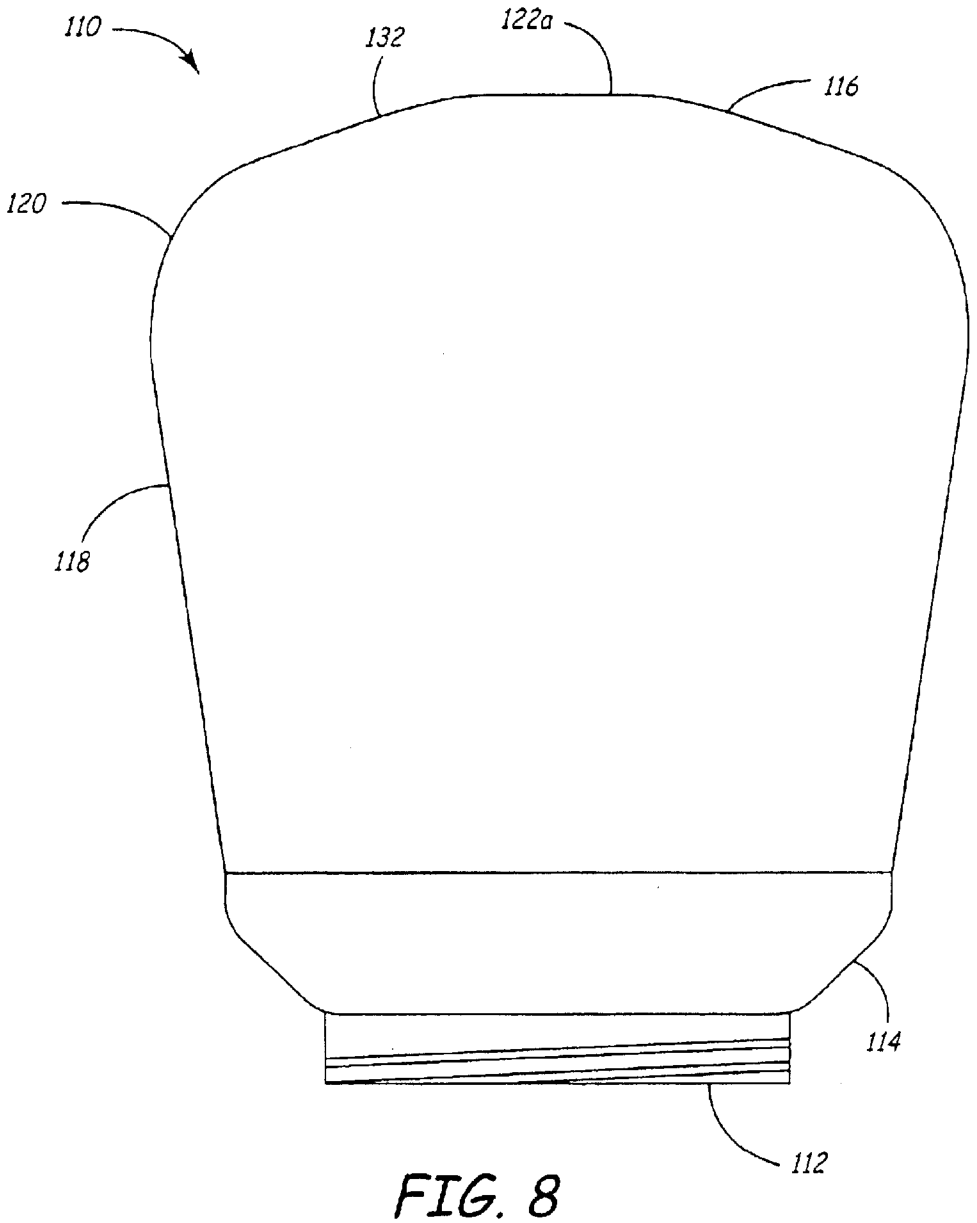
FIG. 8 is a side elevational view of another embodiment of the present invention having a domed bottom.

Referring to FIG. 8, an embodiment of the container 110 includes a domed bottom 132. The domed bottom 132 has a generally flat bottom face 122(*a*) so that the container 110 will stand in a stable disposition when in its upright orientation. The flat bottom face 122(*a*) has a substantially reduced area as compared the surface 122 of the embodiment of FIGS. 5–7. The domed bottom 132 helps to promote total dissolution of the solid cast chemical product in the container 110 by preventing a spray generated by nozzle that has a rather strong central jet from generating a donut of undissolved solid cast chemical product in the bottom portion of the container 110. Having the domed bottom 132 allows the chemical product at point 122(*a*) to be removed from the container 110 at essentially the same rate as the product disposed along the inner surface of the sides 120, thereby promoting equal and complete dissolution of chemical product as the container 110 nears an empty condition.

Figure 9:
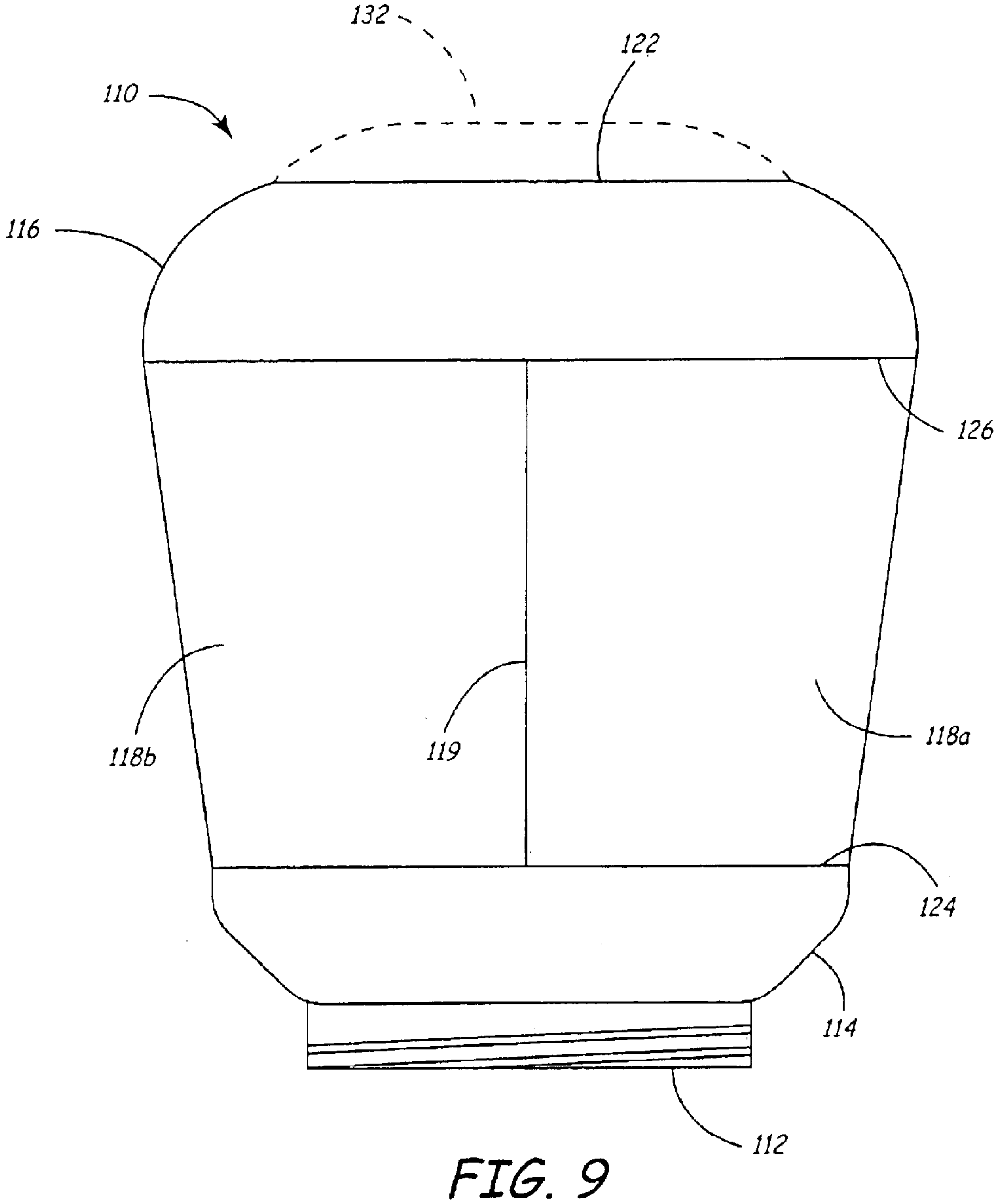
FIG. 9 is a side elevational view of a further embodiment of the present invention having four inclined sides.
Figure 10:
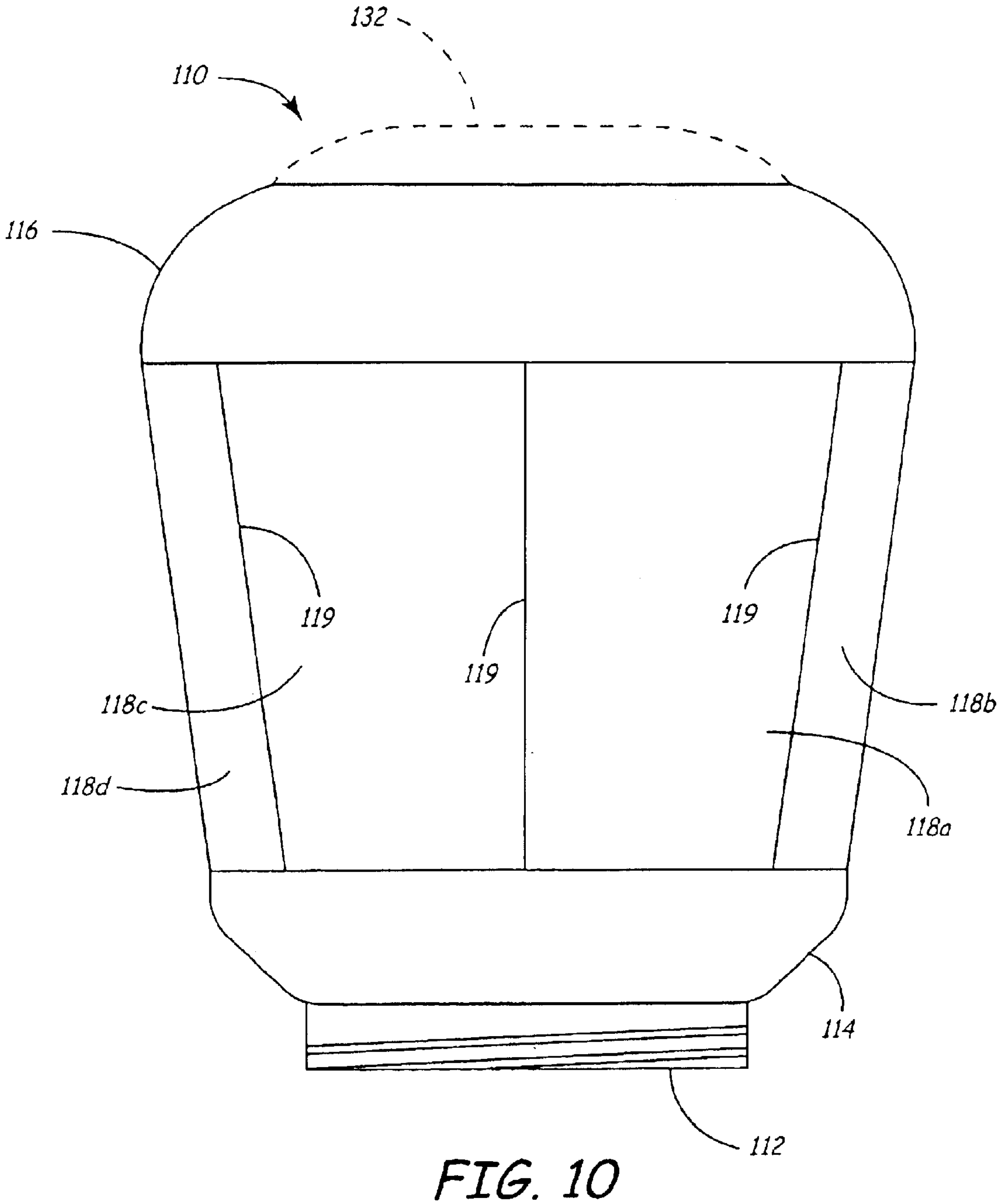
FIG. 10 is a side elevational view of still another embodiment of the present invention having eight inclined sides.

As previously indicated, the containers 110 depicted in FIGS. 5–8 have generally circular inclined sides 118. Turning now to FIGS. 9 and 10, the container 110 depicted in FIG. 9 is four sided, two of the four inclined, generally flat sides being depicted at 118(*a*), 118(*b*) with an intersection at 119. This embodiment of the container 110 may also have the domed bottom 132 (depicted here in phantom) as previously described. The embodiment of FIG. 10 depicts an octagonal sided container 110 having inclined generally flat sides 118(*a*)–118(*c*) joined at intersections 119 being depicted with the four remaining sides being generally opposed to the sides 118(*a*)–118(*d*). As with the embodiment of FIG. 9, the embodiment of FIG. 10 may also have the domed bottom 132. FIGS. 9 and 10 indicate that the container 110 can have a plurality of generally flat sides 118 as long as the sides 118 incline from the bottom 116 to the neck 114.

Figure 11:
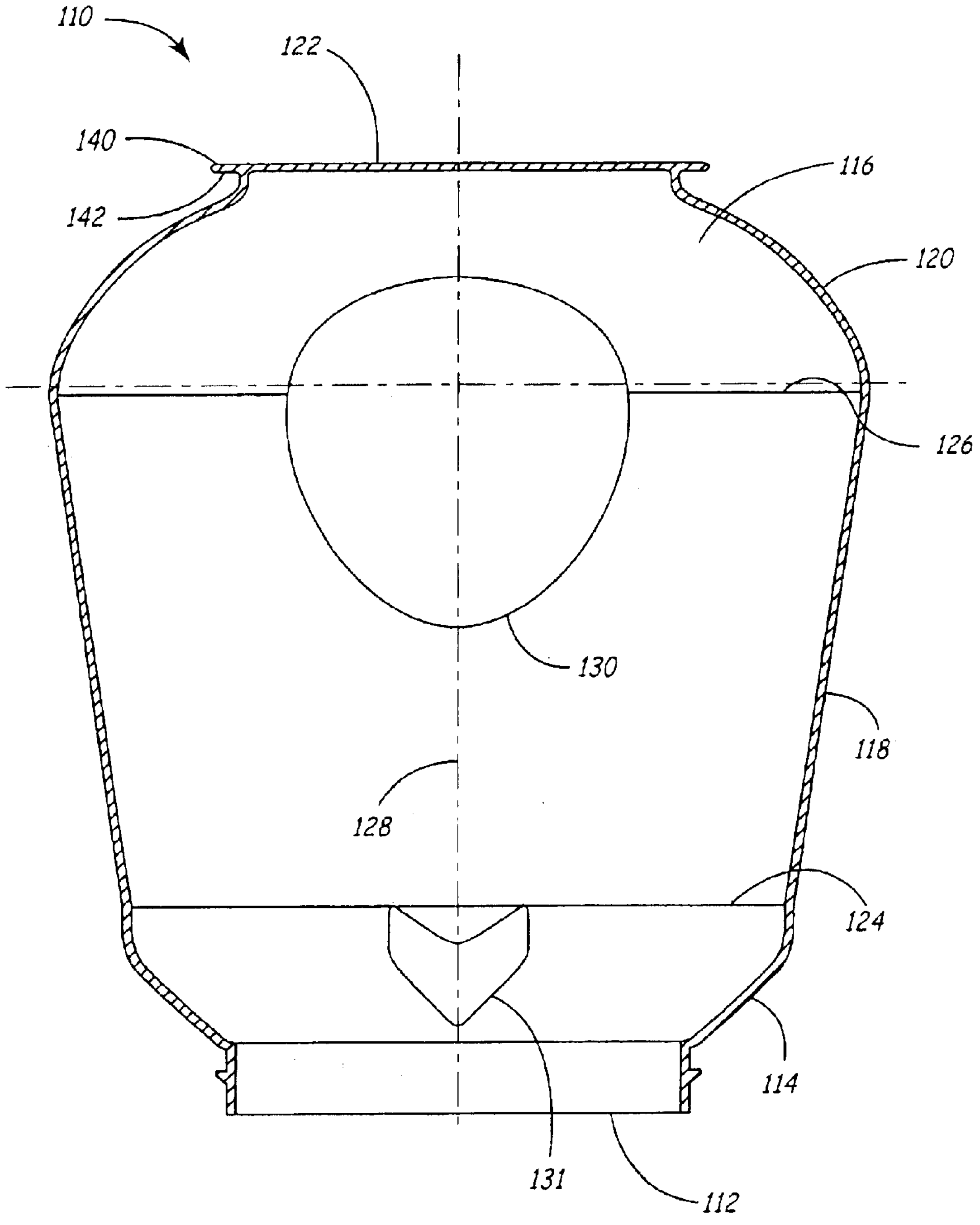
FIG. 11 is a side elevational view of still another embodiment of the present invention having a finger grasp rim.
Figure 12:
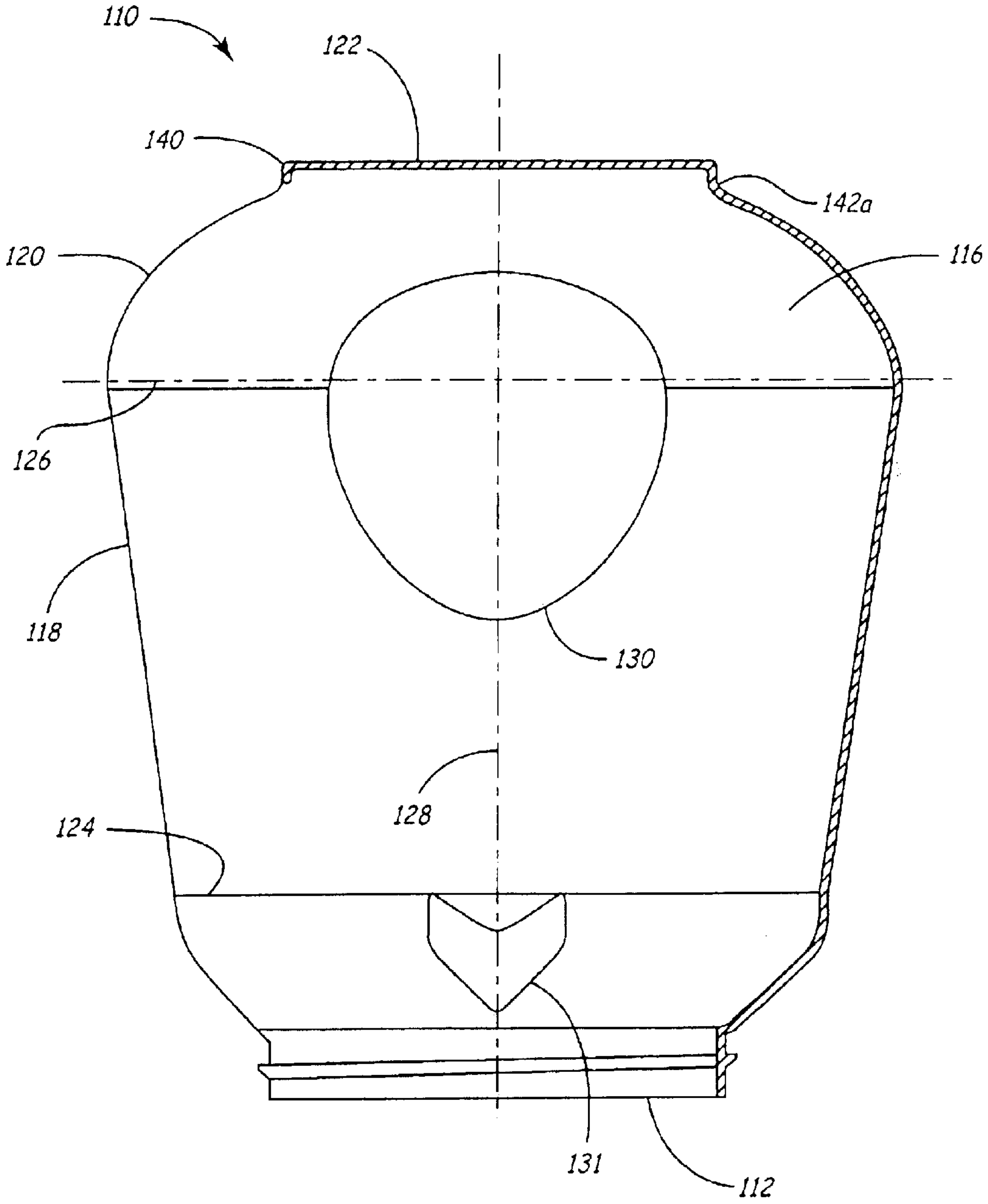
FIG. 12 is a side elevational view of still another embodiment of the present invention having a modified finger grasp rim.

Referring to FIGS. 11 and 12, a container 110 is depicted having features generally similar to the features of FIGS. 5–7, but including a rim 140 formed at the periphery of the flat bottom surface 122. The rim 140 of FIG. 11 has a substantial overhang 142. When the container 110 is disposed inverted in the bowl 14, it is not easily grasped to remove the container 110 from the bowl 14. The rim 140 facilitates grasping the container 110 with the tips of the digits of one hand for withdrawing the container 110 from the bowl 14. The overhang 142*a* of the embodiment of FIG. 12 is not so pronounced as the overhang 142 of FIG. 11, but is still readily graspable by the digits of one hand for withdrawing the container 110 from the bowl 14. The overhang 142*a* facilitates the forming of the container 110.

Figure 13:
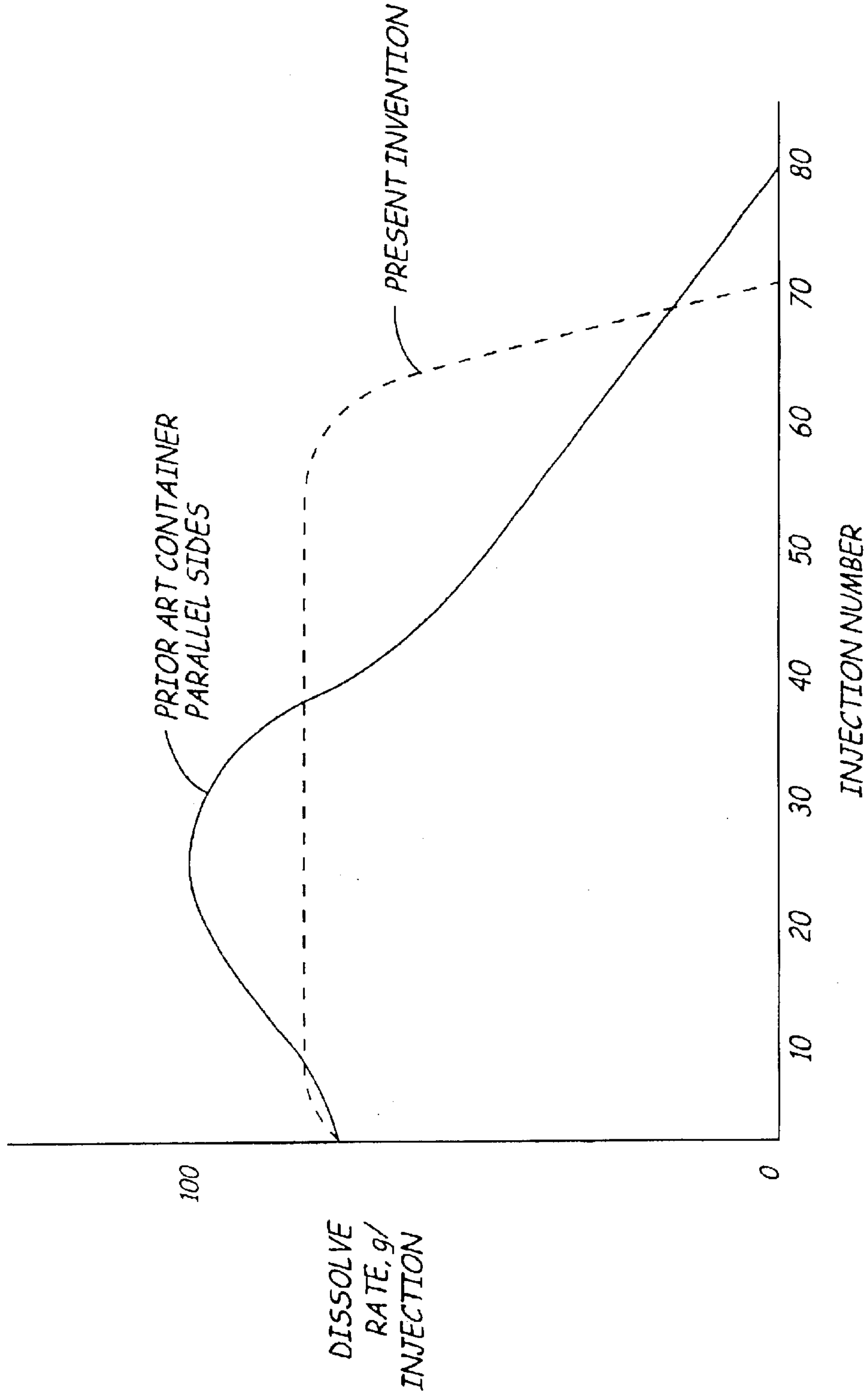
FIG. 13 is a graphic representation of the dissolution rate per injection of the present invention as compared to a prior art container.

The graph of FIG. 13 depicts the delivery rate of chemical product dissolved per injection of solvent commencing at the first injection when the containers are full and ending at the last injection when the containers are empty. Delivery rate is defined as the amount of the chemical product dissolved from the container. This is the weight of chemical product dissolved at a specific temperature of the solvent and a specific duration of the injection of the solvent. The prior art parallel-sided containers deliver a significantly higher amount of chemical product in dissolving the first half of the contents of the container than in dissolving the second half of the container, especially the limited amount of chemical product remaining between the seventieth and eightieth injection. Toward the end of the cycle of injections, so little chemical product is dissolved as to generate an insufficiently strong solution to accomplish the desired task. The present invention is designed to more consistently dissolve the chemical product throughout the full range of solvent injections from the first to the last. It should be noted that with the present invention, the chemical product is dissolved in a fewer number of injections, but that the amount dissolved per injection is relatively constant.

It will be obvious to those skilled in the art that other embodiments in addition to the ones described herein are indicated to be within the scope and breadth of the present application. Accordingly, the applicant intends to be limited only by the claims appended hereto.

What is claimed is:

1. A container for use with a solution dispenser, the solution dispenser generating a solution by impinging a solvent spray on a solid cast chemical product disposed within the container, the container being disposable in an inverted disposition in a solution dispenser bowl, the container comprising:

a container body suitable for containing a flowable chemical composition and supporting a casting of the chemical composition, the container characterized by a container longitudinal axis;

the container body having a mouth for receiving the solvent spray therein;

the container body having a container bottom being disposed generally opposed to the mouth; and the container body having an inclined side portion operably coupled to and extending between the container bottom and the container mouth, a cross sectional dimension of a cross section of the side portion decreasing from the container bottom portion to the container mouth, an angle of inclination of the inclined side portion with respect to the container longitudinal axis being substantially between five degrees and thirty degrees.

2. The container of claim 1 including at least one lockout defined on the container body.

3. The container of claim 1 including at least one flat formed on the inclined side portion.

4. The container of claim 3 including at least a second flat formed on the inclined side portion being generally opposed to the at least one flat.

5. The container of claim 2 wherein the at least one lockout is formed for cooperative engagement with an inverted lockout formed on an interior surface of the bowl.

6. The container of claim 5 including at least one flat formed on the inclined side portion and wherein the at least one lockout acts to orient said at least one flat formed on the inclined side portion of the container in a selected orientation.

7. The container of claim 5 wherein the at least one lockout acts to selectively orient viewable data disposed on the inclined side portion of the container for viewing by a user when the container is disposed in an inverted disposition in the solution dispenser bowl.

8. The container of claim 1 wherein the cross section of the inclined side portion defines a circle.

9. The container of claim 1 wherein the cross section of the inclined side portion defines a polygon having at least four sides.

10. The container of claim 1 wherein the cross section of the inclined side portion defines a polygon having eight sides.

11. The container of claim 1 wherein the angle of inclination of the inclined side portion with respect to a container longitudinal axis is substantially nine degrees.

12. The container of claim 1 wherein the container bottom is domed.

13. A solution dispenser for generating a solution by impinging a solvent spray on solid cast chemical product, comprising:

a spray nozzle for generating the solvent spray, the solvent spray defining a generally conical spray pattern a solution dispenser bowl having an upwardly directed bowl opening, the spray nozzle being disposed generally opposite to the bowl opening of the solution dispenser bowl for directing the solvent spray in a generally upward direction;

a container being disposable in an inverted disposition in the solution dispenser bowl, the container having a container body suitable for containing a flowable chemical composition and supporting a casting of the chemical composition;

the container body having a mouth for receiving the solvent spray therein;

the container body having a container bottom being disposed generally opposed to the mouth; and the container body having an inclined side portion operably coupled to and extending between the container bottom portion and the container mouth, a cross sectional dimension of the side portion decreasing from the container bottom to the container mouth, an angle of inclination of the inclined side portion with respect to a container longitudinal axis being substantially between five decrees and thirty degrees.

14. The solution dispenser of claim 13 including a lockout defined on the container body.

15. The solution dispenser of claim 13 including first flat formed on the inclined side portion.

16. The solution dispenser of claim 15 including a second flat formed on the inclined side portion, the second flat being generally opposed to the first flat.

17. The solution dispenser of claim 14 wherein the lockout is formed for cooperative engagement with an inverted lockout formed on an interior surface of the bowl.

18. The solution dispenser of claim 14 wherein the lockout acts to orient at least one flat formed on the inclined side portion of the container in a selected orientation.

19. The solution dispenser of claim 14 wherein the lockout acts to selectively orient viewable data disposed on the inclined side portion of the container for viewing by a user when the container is disposed in the inverted disposition in the solution dispenser bowl.

20. The solution dispenser of claim 13 wherein a cross section of the inclined side portion defines a circle.

21. The solution dispenser of claim 13 wherein a cross section of the inclined side portion defines a polygon having at least four sides.

22. The solution container of claim 21 wherein the cross section of the inclined side portion defines a polygon having eight sides.

23. The solution container of claim 13 wherein the angle of inclination of the inclined side portion with respect to a container longitudinal axis is substantially nine degrees.

24. The solution container of claim 13 wherein the container bottom portion is domed.

25. The solution container of claim 13 further including a rim disposed peripherally to the container bottom portion.

26. The solution container of claim 25 wherein the rim presents an overhang for facilitating grasping of the container.

27. The container of claim 1 further including a rim disposed peripherally to the container bottom portion.

28. The solution container of claim 27 wherein the rim presents an overhang for facilitating grasping of the container.

29. A method of promoting consistent dissolution of a cast chemical product, comprising:

disposing a container having the cast chemical product therein in an inverted disposition;

presenting a mouth of the container to a nozzle;

spraying a solvent from the nozzle onto the cast chemical product; and inclining a side portion of the container inwardly from a container bottom portion toward the mouth of the container at an angle with respect to the side portion and a container longitudinal axis of substantially between five degrees and thirty degrees.

30. The method of claim 29 including forming at least one flat on the side portion of the container.

31. The method of claim 30 including doming the bottom portion of the container.

32. A multiple dispenser for generating a first solution and a second solution and comprising first and second solution dispensers, each of the first and second solution dispensers comprising the solution dispenser of claim 14, the solution dispenser bowls of the first and second solution dispensers disposed in a generally side-by-side arrangement, a flat of the container of the first solution dispenser being disposed generally adjacent a flat of the second solution dispenser, the solution dispenser bowl of the first dispenser generally adjacent the solution dispenser bowl of the second dispenser.

33. A dispenser for generating a first solution or a second solution by impinging a first or a second solvent onto a first or a second chemical product, the dispenser comprising:

first and second spray nozzles for generating the first and second solvent sprays, respectively, each of the first and second solvent sprays defining a generally conical spray pattern;

first and second solution dispenser bowls, each of the first and second solution dispenser bowls having an upwardly directed bowl opening, the first and second spray nozzles disposed generally opposite the bowl openings of the respective first and second solution dispenser bowls for directing the respective first and second solvent sprays in a generally upward direction;

first and second containers, each of the first and second containers disposable in an inverted direction in the respective first and second solution dispenser bowls, each of the first and second containers having a container body suitable for containing a respective first and second flowable chemical composition and supporting a casting of the first and second flowable chemical composition into the respective first and second chemical product, the container body of each of the first and second containers having a container mouth, a container bottom, and a container inclined side portion, the container mouth for receiving the first or second solvent spray therethrough, the container bottom disposed generally opposed to the container mouth, and the container inclined side portion operably coupled to and extending between the container bottom and the container mouth, a cross sectional dimension of the container inclined side portion decreasing from the container bottom to the container mouth, an angle of inclination of the inclined side portion with respect to a container longitudinal axis substantially between 5 degrees and thirty degrees.

34. The solution dispenser of claim 33, further including a first lockout defined on the first or second container bodies.

35. The solution dispenser of claim 33, further including a first flat formed on the inclined side portion of the first or second containers.

36. The solution dispenser of claim 35, further including a second flat formed on the inclined side portion of the first or second containers and generally opposed to the first flat.

37. The solution dispenser of claim 36, in which the first and second solution dispenser bowls are in a generally side-by-side arrangement, the first flat of the first container adjacent the first flat of the second container.

38. The solution dispenser of claim 35, in which the first lockout is formed for cooperative engagement with an inverted lockout formed in an interior surface of the first or second bowl.

* * * * *

UNITED STATES PATENT AND TRADEMARK OFFICE

CERTIFICATE OF CORRECTION

PATENT NO. : 6,737,028 B1
DATED : May 18, 2004
INVENTOR(S) : William H. Scepanski and Timothy E. Laughlin It is certified that error appears in the above-identified patent and that said Letters Patent is hereby corrected as shown below:

Title page,
Item [56], References Cited, FOREIGN PATENT DOCUMENTS, please insert the following reference: -- CA 848799 8/1970 --

Column 2,
Line 7, delete "ran" and insert -- run --
Line 46, after "container", insert -- . --

Column 7,
Line 15, after "on", insert -- a --
Lines 24-28, delete and insert the following:
a container being disposable in an inverted disposition in the solution dispenser bowl, the container having a container body suitable for containing a flowable chemical composition and supporting a casting of the chemical composition;
Line 35, delete "portion"
Line 40, delete "decrees" and insert -- degrees --

Signed and Sealed this

Twenty-fourth Day of May, 2005

JON W. DUDAS
*Director of the United States Patent and Trademark Office*